United States Patent Office 2,770,577
Patented Nov. 13, 1956

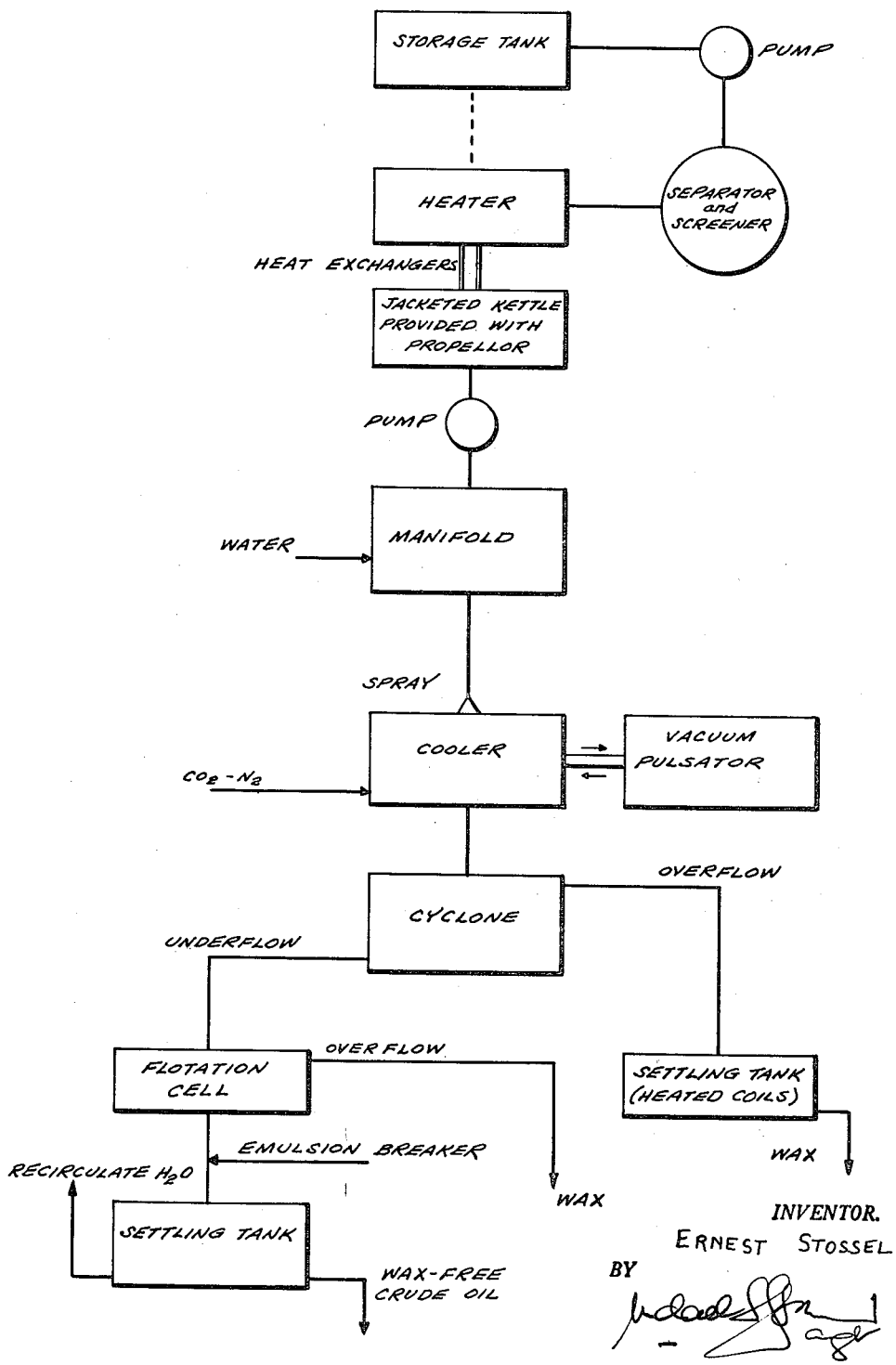

2,770,577

PROCESS OF SEPARATING MICROCRYSTALLINE WAXES FROM CRUDE OIL

Ernest Stossel, San Francisco, Calif.

Application July 11, 1952, Serial No. 298,305

5 Claims. (Cl. 196—18)

The present application is a continuation-in-part of my copending U. S. patent application Serial No. 711,218, filed November 20, 1946, now abandoned, for "A Process of Separating Microcrystalline Waxes From Crude Oil."

The present invention relates to a process of separating high melting point waxes from crude oil, and more particularly to a process of separating crude oil into three major fractions, namely, high melting point waxes, dehydrated crude oil free of high melting point waxes, and a third fraction consisting of water, salt, dirt and sand.

The economic handling and disposal of residues from petroleum crude oil production and oil field waste emulsions that accumulate in the bottoms of lease and refinery crude oil storage tanks is a great problem in the petroleum industry. Large quantities of these residues and emulsions are worked up, recovered oil returned to pipeline operation and thousands of tons of residues from mixed base crude oil are shipped to wax factories for extraction of high melting point waxes which are used in a great variety of manners by many different industries.

In the conventional processes for recovering the crude oil and separating the waxes from the storage tank residues, the sometimes very stable emulsions of crude oil, waxes and water are treated with demulsifying chemical agents after removal of extraneous matter and screening of the emulsion in liquid state. The emulsions are thus broken under application of heat by batch quiescent or semi-continuous flow methods. However, according to these processes, the separation of the crude oil from the emulsion requires a series of processing steps which are very difficult to control.

In the processes now in use, no separation of the valuable waxes from crude oil is achieved during the dehydration steps, valuable waxes are lost and the value of the recovered crude oil from many mixed base residues is greatly reduced. According to these processes additional steps of refining, distilling and solvent extraction are required in order to recover the waxes from the dehydrated crude oil residues.

It is necessary under the old processes in order to accomplish the complete separation of the waxes from the dehydrated crude oil to utilize a well-equipped wax plant, particularly where it is desired to extract high melting point waxes from the crude oil. This therefore requires shipping the residue itself to the wax plants, which causes a great deal of dead weight to be shipped, thereby considerably increasing the cost of the extracted waxes.

It is therefore an object of the present invention to provide new processes for separating high melting point waxes, and more particularly microcrystalline waxes from crude oil and from mixed emulsions of crude containing the same.

It is another object of the present invention to provide a continuous process for separating high melting point waxes, dehydrated crude oil and waste ingredients such as dirt, sand and water from crude oil in substantially pure fractions of each.

It is still another object of the present invention to provide a process for economically separating microcrystalline waxes from crude oil containing the same by processes which require simple enough installations so that the processes can be carried out at the oil fields without the necessity for shipping the crude oil residues to wax plants.

It is a further object of the present invention to provide processes of separating crude oil residues and crude oil emulsions containing naturally occurring water into three fractions, namely waxes, crude oil and waste water, in a continuous process without subjecting the emulsions to the cumbersome process steps of dehydrating the crude oil. These processes are applicable to all kinds of crude oil residues containing besides a high percentage of high melting point waxes, also asphaltic and resinous ingredients.

It is a still further object of the present invention to provide means of lowering the high pour point and viscosity of crude oils and crude oil emulsions, which high pour point is due to a high percentage of amorphous waxes in the oils.

A further object of the present invention comprises the separation of high melting point waxes at very low cost directly from crude oil without the use of other organic diluents than fractions from the crude oil itself or without the use of any organic diluents at all.

A still further object of the present invention comprises the production of asphaltene dispersions in high melting point colloidal waxes in substantially oil-free state by means of a simplified process and without the use of other solvents than fractions of the crude oil itself, thus obtaining a series of asphaltic compounds in which high melting point colloidal waxes constitute the continuous phase of the colloidal system and act as protective colloids.

It is yet another object of the present invention to provide processes which utilize simplified installations for the separation of the compounds which are solid at ordinary temperatures from the liquid crude oil, by elimination of the necessity for utilizing low boiling point solvents hitherto generally utilized for de-waxing oils and de-oiling waxes, and thus provide means for processing the emulsions of crude oils and waxes near the location where these residues occur. The recovered, substantially wax-free, crude oil may then be returned to the pipeline and the solid, substantially oil-free, wax compounds in highly concentrated form may be shipped to the processing plants.

It is also an object of the present invention to utilize economically the residues of the production of paraffin and mixed base crude oil such as from storage tank bottoms, emulsions of crude oil from storage tanks and generally any oil residue containing besides microcrystalline waxes also asphaltic and resinous ingredients.

The high melting point waxes obtained by my new process as disclosed herein contain the petroleum ether insoluble asphaltic bodies and resins in a dispersion stabilized by the colloidal waxes themselves, which dispersion forms a valuable and economically obtainable raw material for coating and construction purposes and for the manufacture of high melting microcrystalline waxes and the derivatives of high molecular petroleum hydrocarbons.

These dispersions represent colloidal systems analogous to conventional petroleum asphalts but having a continuous phase of high melting point wax base substituted for the oil phase of the latter. The dispersions resist oxidation and are useful as stabilizers for petroleum asphalts.

With the above objects in view, the present invention mainly comprises the steps of heating crude oil and/or crude oil emulsions containing high melting point waxes and also containing resinous and asphaltic ingredients at a predetermined temperature above the solvation temperature of said waxes in said oil which reduces to an optimum degree the pour point and viscosity of said crude oil so as to stabilize the colloidal systems in said crude oil by temporarily reducing the pour point and viscosity to an optimum degree and converting said crude oil to a homogeneous oil-in-water emulsion; thereby forming a homogeneous stabilized oil-in-water emulsion, cooling said homogeneous stabilized oil-in-water emulsion during the optimum pour point and viscosity hysteresis period until precipitation of said high melting point waxes from said emulsion, and collecting the thus precipitated high melting point waxes, thereby obtaining dispersions of asphaltenes and resins in substantially pure high melting point waxes.

The stabilizing of the colloid systems by heating until solvation of the waxes in the oil and the conversion of the various types of crude oil emulsions to a homogeneous oil-in-water emulsion may be carried out in any order. The stabilizing step may precede the conversion step or the conversion step may precede the stabilizing step. In either event, a homogeneous stabilized oil-in-water emulsion is obtained, which can be further treated according to the process of the present invention for relatively simple separation of the microcrystalline waxes from the crude oil.

I have found that in colloidal solutions of microcrystalline waxes in hydrocarbons, stabilization of the colloidal solutions forming part of the lyophilic colloids appears to be caused by solvation of these colloidal particles, and that similar to many reversible colloids, the colloidal systems of microcrystalline waxes in crude petroleum oils behave in this manner only within a certain temperature range. At lower temperatures solvation takes place and at higher temperatures dissolution takes place.

I have found that high melting point microcrystalline waxes can be brought to precipitate directly from crude oil or crude oil sediments rich in such waxes by cooling and thus precipitating the same from stabilized colloidal systems in a homogeneous emulsion of oil-in-water.

The stabilization of the colloid systems is achieved by heating the crude oil, either in its original state or after conversion of the same to a stable oil-in-water emulsion, at a predetermined temperature which is above the solvation temperature of the waxes in the crude oil and which reduces to an optimum degree the pour point and viscosity of the crude oil. By reduction of the pour point and viscosity of the crude oil to an optimum degree is meant the reduction of these characteristics to an extent which will have the longest period during which the maximum of obtainable reduction of pour point and viscosity persists before the original conditions are restored—the optimum of hysteresis. Simple pretesting of samples of the crude oil can determine for each crude oil what the best temperature for heating, and any other conditions, such as time of heating, which will result in the optimum reduction of pour point and viscosity. The exact temperatures for heating of all different crude oils in order to obtain optimum reduction of pour point and viscosity cannot be given because it varies depending on the composition of the oil, i. e. its contents of asphaltic and resinous ingredients, as well as its content of light oils and high viscosity oils. In any event, the temperature will always be above the temperature at which solvation takes place.

By this stabilization treatment, at a temperature above that at which solvation of the high melting point waxes takes place, the oil insoluble asphaltic bodies are brought to interaction with the resins and microcrystalline waxes, under predetermined conditions of temperature and time of heating; they remain thus in a state of colloidal dispersion in the oil, the resinous materials and colloidal waxes acting as protective colloids. Stabilization performed at the optimum conditions remains effective at lower temperatures until the equilibrium is disturbed. The viscosity and pour point of these oils are temporarily changed by the stabilizing treatment and the corresponding values will be considerably lower and remain reduced during a certain time after which they return slowly to their original values.

According to the present invention, it is this combination of stabilizing treatment with conversion of the various types of emulsions to a single homogeneous oil-in-water emulsion which allows for precipitation of the high melting point microcrystalline waxes contained in the crude oil by cooling during the optimum pour point and viscosity hysteresis period.

The conversion to a homogeneous oil-in-water emulsion is accomplished by mixing the crude oil with water and agitating the mixture by usual agitation means or by spraying the same through a nozzle. Other methods for forming the homogeneous oil-in-water emulsion, i. e. by the addition of emulsifying agents to the mixture of crude oil and water, may also be utilized, the scope of the present invention not being limited to any particular means for obtaining the oil-in-water emulsion.

As an example of achieving the "optimum of hysteresis," i. e. the longest period during which the maximum of attainable reduction of pour point and viscosity persists before the original conditions are restored, the following results were obtained with an Argentine crude oil having a pour point of 32° C., and a viscosity Saybolt of 172 sec. at 37.7° C. and containing 14.3% gasoline, i. e. light naphtha distilled up to 200° C.

| Heating | | Viscosity S. V. in Sec. at 37.7° C. | Pour Point | |
|---|---|---|---|---|
| Temp. in °C. | Time In hours | | After 0 hours | After 24 hours |
| | | | | At 20° C. | At 37° C. |
| | | | Degrees | Degrees | Degrees |
| 50 | 2 | 172 | 31 | | |
| | 4 | | 32 | | |
| | 6 | | 31 | | |
| 65 | 2 | | 31 | | |
| | 4 | | 31 | | |
| | 6 | | 32 | | |
| 80 | 1 | 117 | 19 | 23 | |
| | 2 | | 10 | 18 | 23 |
| | 3 | | 12 | 18 | 26 |
| | 4 | | 14 | 18 | 22 |
| | 6 | 135 | 26 | 23 | 28 |
| 100 | ½ | | 8 | 12 | |
| | 1 | 112 | 5 | 14 | |
| | 2 | | 9 | 14 | |

Another example is that of a West Texas crude oil, original pour point 60.5° F., Saybolt viscosity 170 sec. at 75° F, light naphtha 28.8%:

| Heating | | Viscosity S. U. sec. at 75° F | Pour Point, ° F. | |
|---|---|---|---|---|
| Temp., ° F | Time, hours | | After 0 hours | After 24 hours |
| | 0 | 170 | 60.5 | 60.5 |
| 125 | 2 | 118 | 0 | 16 |
| 125 | 3 | | 0 | 16 |
| 125 | 4 | | 0 | 0 |
| 125 | 6 | | 0 | 20 |
| 125 | 12 | | 0 | 36 |
| 160 | 2 | 115 | 0 | 20 |

It is a preferred embodiment according to the present invention to effect the cooling of the homogeneous stabilized oil-in-water emulsion in an oscillating vacuum produced e. g. in accordance with my U. S. Patent No. 2,684,075. The cooling of the emulsion in an oscillating vacuum causes further reduction of the pour point and viscosity of the crude oil and also causes disintegration of the emulsion by the shaking and pulsating action of the oscillating vacuum. Cooling under these conditions causes the precipitation of the high melting point waxes, which may contain asphaltenes and resins dispersed therein, in the remaining emulsion of the other ingredients of the crude oil in the emulsion water.

Although it is preferred to disintegrate the emulsion while cooling, by cooling in an oscillating vacuum, any other means for disintegrating the emulsion while cooling may be utilized. For example, it is possible to agitate the emulsion while cooling in order to disintegrate the same. The best results have, however, been obtained by cooling in an oscillating vacuum, the pulsating movement of the oscillating vacuum in addition to effecting the disintegration of the emulsion also additionally depressing the pour point of the oil temporarily by breaking down the structure of the thixotropic gels to a sol or by preventing the resetting of the gel. The formed emulsion shows a very great uniformity of the particles in the dispersed phase and an extremely fine state of dispersion.

The process of the present invention thereby allows for obtaining a very fine dispersion of the precipitate in a stable emulsion of the crude oil in water. The dispersed precipitate consists essentially of high melting point colloidal waxes and asphaltic materials practically free of oil and crystalline paraffin.

I can produce the oscillating vacuum while cooling by connecting the inlet of the pulsator valve as described in my Patent No. 2,684,075 with the vacuum connection of the cooler and the outlet of the pulsator with the vacuum refrigeration pump or jet. The pulsating action to which the emulsion and eventually the dispersion are subjected by a rapid succession of pressure changes, results in an intimate intermingling of the two phases of the emulsion and the third phase from the dispersion, and therefore results in a disintegration of the molecular aggregates which are still further divided by the movement due to the evaporaton in vacuo of part of the low boiling oils and water contained in the emulsion. The cooling in an oscillating vacuum is also advantageous in that by carrying out the cooling step in an oscillating vacuum, it is possible to considerably shorten the time of heating of the crude oil in the first stabilization step because of the further reduction of the pour point by the pulsating action of the oscillating vacuum.

In conventional practice of emulsion de-oiling of waxes, the emulsification and crystallization are accomplished simultaneously in the same zone by the direct introduction of water at such a temperature below the melting point of the wax that crystallization takes place at the same time the oil is emulsified. The amount of water introduced is regulated by a control valve which is governed by the temperature of the final emulsion. The water is recycled from a self-contained water cooling system where the cooling is effected e. g. by steam jet refrigeration in vacuo. The temperature of the water passing through the vacuum refrigeration system is lowered due to partial evaporation of water (in vacuo at low temperature).

Attempts to cool the finished warm emulsion by partial evaporation of water in vacuo have hitherto failed and resulted in decomposition of the emulsion. The conventional processes of emulsion de-oiling had to rely, thus, on the introduction of previously cooled or chilled water to effect crystallization and emulsification simultaneously. These processes were only applicable for the separation of oil from sweater stock (sweatable waxes, or waxes of more or less defined crystalline structure).

I have found that I can accomplish precipitation by cooling and simultaneous emulsification and/or dispersion of the vacuum by the use of an oscillating vacuum instead of a continuous one. Thus, while evaporation of a small part of the water effects a cooling action which results in precipitation, simultaneously the pulsating action, by which the materials (oil-emulsion and precipitate) are subjected to a rapid succession of diminution and increase in pressure, effects an intermingling and disintegration even before the precipitate has been allowed to agglomerate. These effects can be achieved by my new device in a simplified way and with little power and wear of parts.

The oscillating vacuum in the present process might be produced by any kind of vacuum breaker or pulsator devised or which can be set for automatically producing a pulsating, intermittent, reciprocating or oscillating action, or more particularly for effecting automatically rapid changes of pressure while a continuous vacuum is applied. While I might use any of these conventional methods for producing an oscillating vacuum, I prefer the pulsator device as described in my Patent No. 2,684,075, whose pulsations are controlled by a resilient, yieldable diaphragm actuated by changes in volume and pressure of a confined gas. This vacuum breaker device is of an extremely simple construction and can be easily set to produce oscillating changes in air pressure when connected to a source of continuous vacuum, e. g. a vacuum pump or a steam jet ejector or the like. Two or more of these pulsator valves might be connected in parallel on one side to the source of vacuum, on the other by valves to the cooler in order to achieve the desired performance. Without interrupting of the cooling and disintegrating operation one or more of these pulsators can be disconnected and the diaphragms exchanged.

The warm emulsion can be introduced into the cooling chamber in a fine spray in conventional ways to obtain immediately a fine precipitation in extremely fine dispersion in the oil emulsion, or I can prepare the emulsion in such a way e. g. by proper choice of the emulsifying agents, that I obtain an emulsion-dispersion which leaves the cooler as a homogeneous liquid or cream. This latter kind of emulsion is of interest in the preparation of stable wax-emulsions e. g. for polishes. The type of emulsion for separation of oils and waxes, however, will be preferably, a non-stable dispersion in a stable emulsion.

When effecting the cooling of the wax-containing crude oil emulsion in an oscillating vacuum I achieve, thus, the following: (1) breaking up the structure of the wax by the shaking action of the air-pressure changes which results in a temporary reduction of the pour point and viscosity and will thus further the aims of the present invention, (2) precipitation of the wax-asphalt compound while simultaneously disintegrating the precipitating particles still in formation, (3) since the evaporation of water will take place preferably where heat of crystallization is emitted by the solidifying wax, the combined cooling and precipitation will still further the disintegration, (4) dispersion of the precipitate in a stabilized emulsion of great uniformity and extremely fine state, and (5) saving in power and machine parts and good control of the operation.

The present invention also contemplates the separation of the wax-free and also asphaltene-free crude oil from the emulsion of the crude oil in water. This is accomplished by separating the precipitated high melting point waxes from the emulsion, and breaking the emulsion by any common means such as by the use of demulsifying chemical agents, in order to cause the separation of the wax-free crude oil from the emulsion water. The crude oil which is thus obtained is substantially dehydrated; but if desired it may be further dehydrated by evaporation of the water therefrom.

The precipitated high melting point waxes may be separated from the remaining emulsion by centrifuging. It is also possible according to the present invention to separate the precipitate from the emulsion by any other method such as flotation or air flotation. Air flotation or any other method may be utilized also for the separation of the wax-free crude oil from the emulsion water.

The present invention, by the utilization of the steps of converting the crude oil emulsions to a homogeneous oil-in-water emulsion in combination with the stabilization of the colloid systems by heating, allows for the separation of the crude oil into a wax phase free of oil and an oil phase free of wax by simple precipitation and separation methods. The combination with these steps of conversion and stabilization of the cooling in an oscillating vacuum also aids in the separation of the phases. The process of the present invention, by the above combination of steps, also allows for the fractional precipitation of the high melting point waxes into waxes of different melting point and molecular weight, the oscillating vacuum being particularly useful where fractional precipitation is desired.

If the crude oil taken from the storage tanks, etc. contains a high quantity of dirt and sand, the crude oil is first subjected to a screening treatment in order to separate the dirt and other impurities from the crude oil before subjecting the same to the process of the present invention.

The conversion of the crude oil emulsions to a homogeneous oil-in-water emulsion makes it unnecessary to dehydrate the crude oil or crude oil residues rich in waxes before stabilizing the colloidal systems. It has been found by the present invention that the separation of high melting point waxes from the homogeneous stabilized oil-in-water emulsions can be achieved in substantially quantitative yield directly from the emulsion by disintegrating and finely dispersing the same while cooling, particularly by effecting the cooling of the emulsion in an oscillating vacuum.

The precipitated solids are thus obtained in the form of an extremely fine dispersion in an emulsion of crude oil in water from which the waxes can be separated i. e. by flotation. The crude oil emulsion, free from waxes and heavy asphaltic bodies, is treated in a finel step with emulsion breaking compounds which are commonly used in conventional processes i. e. sodium silicate, and separated by air flotation from water and insoluble impurities.

In most cases the crude oil emulsion obtained after the disintegration step is stable enough to separate as such during the first flotation step from the solid compounds. In some cases it is necessary, however, to aid the emulsification of the crude oil by adding to the dispersion-emulsion small quantities of emulsifiers, preferably of the non-ionic or cationic type. The proper choice of the emulsifiers may be simply made by preliminary testing.

Both fractions thus obtained from the flotation steps can be further purified in conventional ways by repeating the flotation separation and finally centrifuging or settling to free from water.

All the steps of my present invention i. e. conversion of the varied types of crude oil emulsions into a homogeneous oil-in-water emulsion, stabilizing of the colloidal systems in the crude oil, disintegration and cooling of the stabilized emulsion, preferably by cooling in an oscillating vacuum, and finally, separation by flotation of the dispersed solids from emulsified crude oil as well as flotation separation of the crude oil from water and impurities, can be made in a continuous process.

The following examples which are described in connection with the attached flow sheet will clearly disclose the most important characteristic features of my present invention. I wish to stress, however, that these examples are not intended to limit the scope of my invention to the features disclosed in the same.

Example 1

An emulsion obtained from the bottoms of East-Texas crude oil storage tanks, containing an average of 36% of water, is pumped from a clearing tank through a heater where it is heated at a temperature of 150° F., thence through heat-exchangers into a cylindrical jacketed kettle which is provided with a turbine type propeller and deflecting blade rings. 0.03% of rosinamineacetate is added to the hot emulsion. If the crude oil contains a large amount of dirt, it is first sent through a screener for separation of the dirt. The temperature of the liquid is brought to 190–195° F. and kept at this temperature during 45 minutes while the emulsion is vigorously stirred, these heating conditions have been found in a preliminary laboratory test to produce the "optimum of pour point hysteresis" in order to stabilize the crude oil.

The hot emulsion is then pumped through a manifold, mixed with an equal amount of water and then sprayed through a tangential nozzle into a cooler, which it enters at a temperature of 165° F. The cooler is connected, through pipes, to a pulsator valve, separator and vacuum jet, the latter is used for vacuum refrigeration. A rotating pump connected through pipes to the bottom of the cooler is set to pump out the emulsion at such a rate as to keep the liquid temperature in the cooler at 135° F. A small amount of carbon dioxide-nitrogen mixture is added through a perforated tube at the inside of the bottom of the cooler at such a rate as to provoke an oscillating movement of the diaphragm in the pulsator valve, connected to the vacuum jet.

The emulsion-dispersion is pumped directly to a cyclone (DorrClone) in which a great part of the wax-asphalt precipitate is separated by centrifugal force from the overflow. The underflow is charged directly into a flotation cell and the precipitate is separated by air flotation in the overflow. The underflow from the flotation cell consisting of a stable emulsion of crude oil in water is treated at a temperature of 128° F. at which it leaves the flotation cell, with a solution of 0.1% commercially available emulsion breaking compound (Breaxit 800), 0.1% soda ash and 0.25% sodium silicate. The crude oil is separated from the water in a settling tank of conventional design and the water is recycled in order to recover some of the crude oil.

The wax-asphalt compound recovered from the overflow of the cyclone is brought to a settling tank provided with heating coils and heated to a temperature of 195° F. during 6 hours after which most of the water has separated from the asphalt-wax compound. It is then further dried during 2 hours at a temperature of 220–240° F. The resulting product shows a melting point of 174–176° F. and a penetration of 16, color—brown black.

The asphalt-wax compound recovered from the overflow of the flotation cell has approximately the same characteristics: melting point 175° F. and penetration 17.

The recovered crude oil which originally showed a pour point of 128° F. is brought through this single-step dewaxing process to a pour point of 38° F., immediately after recovering, and of 62° F. after three days. (After one month the pour point was found to be 61° F.)

Example 2

An emulsion of Argentine crude oil of high wax content (Tupungato) having a pour point of 85° F. (after dehydration) and 16% water in the emulsion is treated as in Example 1, 1.5 parts of water being added for each part of crude oil emulsion. The stabilizing temperature is kept at 175° F. during 1½ hours and the cooled emulsion pumped from the cooler into the cyclone at a temperature of 128° F., then further treated as in Example 1. (Conditions are determined in preliminary tests.)

The separated asphalt wax compound shows a melting point of 160–165° F. and a penetration of 55. The pour point of the crude oil is reduced from the original value of 85° F. to 46° F. and is found after 8 days at 58° F., and did not change during the next four weeks.

Example 3

An undetermined mixture of pit-waste emulsion, tank bottoms, rod-waxes and similar residues of Kansas crude oil production, containing a considerable amount of dirt and 44% of emulsion water, is screened and cleared and pumped at a temperature of 170° F. to the emulsifying tank (manifold) as in Example 1. 0.04% of a mixture of octadecenylamine and abietylamine acetate is added and the mixture stirred at a temperature of 200° F. for 30 minutes. It is then sprayed as in Example 1, into the cooler and, mixed with 0.8 part of water to one part of emulsion. The mixture enters the cooler at a temperature of 165° F. and leaves the cooler at 150° F., at which temperature it is pumped into the cyclone and eventually into the flotation cell, as in Example 1. The asphalt-wax compound separated from the overflow of the cyclone and the flotation cell shows after drying a melting point of 188–190° F. and a penetration of 6—color dark brown.

*Example 4*

1000 lbs. of the asphalt-wax compound obtained from the overflow of the flotation cell in Example 3 is treated at a temperature of 200° F. with 80 lbs. of sulphuric acid in three charges (20 lbs., 40 lbs., 20 lbs.) and a brownish hard wax separated which can easily be bleached with activated clay to amber and yellow color, melting point 184–186° F.

*Example 5*

2500 lbs. of asphalt-wax compound as obtained in Example 3 is blown with air at a temperature of 260° C. for 20 hours. A black, hard compound is obtained which shows a R. & B. melting point of 196° F., ASTM M. P. 215, penetration 2. From this compound the wax is extracted by solvent and shows an acid number of 4, which seems to prove that the wax was not attacked during the blowing process. Upon examination no separation of asphalt particles could be found. (Oliensis test.)

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A process of separating high melting point waxes from crude oil containing the same and also containing resinous and asphaltic ingredients, comprising the steps of heating said crude oil at a predetermined temperature above the solvation temperature of said waxes in said oil which reduces to an optimum degree the pour point and viscosity of said crude oil so as to stabilize the colloidal systems in said crude oil by temporarily reducing the pour point and viscosity to an optimum degree and converting said crude oil to a homogeneous oil-in-water emulsion, thereby forming a homogeneous stabilized oil-in-water emulsion; cooling said homogeneous stabilized oil-in-water emulsion in an oscillating vacuum during the optimum pour point and viscosity hysteresis period until precipitation of said high melting point waxes from said emulsion so as to cool said emulsion and disintegrate the same while further reducing the pour point of said crude oil by shaking action of the oscillating vacuum, thereby precipitating in finely dispersed form said high melting point waxes in an emulsion of the other ingredients of said crude oil in water; and collecting the thus precipitated high melting point waxes, thereby obtaining dispersions of asphaltenes and resins in substantially pure high melting point waxes.

2. A process of separating high melting point waxes from crude oil containing the same and also containing resinous and asphaltic ingredients, comprising the steps of heating said crude oil at a predetermined temperature above the solvation temperature of said waxes in said oil which reduces to an optimum degree the pour point and viscosity of said crude oil so as to stabilize the colloidal systems in said crude oil by temporarily reducing the pour point and viscosity to an optimum degree and converting said crude oil to a homogeneous oil-in-water emulsion, thereby forming a homogeneous stabilized oil-in-water emulsion; cooling said homogeneous stabilized oil-in-water emulsion in an oscillating vacuum during the optimum pour point and viscosity hysteresis period until precipitation of said high melting point waxes from said emulsion so as to cool said emulsion and disintegrate the same while further reducing the pour point of said crude oil by shaking action of the oscillating vacuum, thereby precipitating in finely dispersed form said high melting point waxes in an emulsion of the other ingredients of said crude oil in water; separating the thus precipitated high melting point waxes from the remaining oil-in-water emulsion, thereby obtaining dispersions of asphaltenes and resins in substantially pure high melting point waxes; and breaking the emulsion of the remaining crude oil free of high melting point waxes in water so as to separate said crude oil free of waxes from the emulsion water, thereby obtaining substantially pure dehydrated crude oil free of high melting point waxes.

3. A process of separating high melting point waxes from crude oil containing the same and also containing resinous and asphaltic ingredients, comprising the steps of heating said crude oil at a predetermined temperature above the solvation temperature of said waxes in said oil which reduces to an optimum degree the pour point and viscosity of said crude oil so as to stabilize the colloidal systems in said crude oil by temporarily reducing the pour point and viscosity to an optimum degree; converting the thus stabilized crude oil to a homogeneous oil-in-water emulsion, thereby forming a homogeneous stabilized oil-in-water emulsion; cooling said homogeneous stabilized oil-in-water emulsion in an oscillating vacuum during the optimum pour point and viscosity hysteresis period until precipitation of said high melting point waxes from said emulsion so as to cool said emulsion and disintegrate the same while further reducing the pour point of said crude oil by shaking action of the oscillating vacuum, thereby precipitating in finely dispersed form said high melting point waxes in an emulsion of the other ingredients of said crude oil in water; separating the thus precipitated high melting point waxes from the remaining oil-in-water emulsion, thereby obtaining dispersions of asphaltenes and resins in substantially pure high melting point waxes; and breaking the emulsion of the remaining crude oil free of high melting point waxes in water so as to separate said crude oil free of waxes from the emulsion water, thereby obtaining substantially pure dehydrated crude oil free of high melting point waxes.

4. A process of separating high melting point waxes from crude oil containing the same and also containing resinous and asphaltic ingredients, comprising the steps of converting said crude oil to a homogeneous oil-in-water emulsion; heating the thus formed homogeneous oil-in-water emulsion at a predetermined temperature above the solvation temperature of said waxes in said oil which reduces to an optimum degree the pour point and viscosity of said crude oil so as to stabilize the colloidal system in said crude oil by temporarily reducing the pour point and viscosity to an optimum degree and converting said crude oil to a homogeneous oil-in-water emulsion, thereby forming a homogeneous stabilized oil-in-water emulsion; cooling said homogeneous stabilized oil-in-water emulsion in an oscillating vacuum during the optimum pour point and viscosity hysteresis period until precipitation of said high melting point waxes from said emulsion so as to cool said emulsion and disintegrate the same while further reducing the pour point of said crude oil by shaking action of the oscillating vacuum, thereby precipitating in finely dispersed form said high melting point waxes in an emulsion of the other ingredients of said crude oil in water; separating the thus precipitated high melting point waxes from the remaining oil-in-water emulsion, thereby obtaining dispersions of asphaltenes and resins in substantially pure high melting point waxes; and breaking the emulsion of the remaining crude oil free of high melting point waxes in water so as to separate said crude oil free of waxes from the emulsion water, thereby obtaining substantially pure dehydrated crude oil free of high melting point waxes.

5. A process of separating high melting point waxes from crude oil containing the same and also containing resinous and asphaltic ingredients, comprising the steps of heating said crude oil at a predetermined temperature above the solvation temperature of said waxes in said oil which reduces to an optimum degree the pour point and viscosity of said crude oil so as to stabilize the colloidal systems in said crude oil by temporarily reducing the pour point and viscosity to an optimum degree and converting said crude oil to a homogeneous oil-in-water emulsion, thereby forming a homogeneous stabilized oil-in-water emulsion; cooling said homogeneous stabilized oil-in-water emulsion in an oscillating vacuum during the optimum pour point and viscosity hysteresis period until precipitation of said high melting point waxes from said emulsion so as to cool said emulsion and disintegrate the same while further reducing the pour point of said crude oil by shaking action of the oscillating vacuum, thereby precipitating in finely dispersed form said high melting point waxes in an emulsion of the other ingredients of said crude oil in water; centrifuging the thus formed dispersion of waxes in said crude oil-in-water emulsion so as to separate substantially oil-free waxes from said emulsion, thereby obtaining substantially pure oil-free dispersions of asphaltenes and resins in high melting point waxes; and treating the remaining emulsion of wax-free crude oil in water with at least one demulsifying agent so as to break said emulsion and separate said substantially wax-free crude oil from the emulsion water, thereby obtaining substantially pure dehydrated crude oil free of high melting point waxes.

References Cited in the file of this patent

UNITED STATES PATENTS

| | | |
|---|---|---|
| 1,277,935 | Hussey | Sept. 3, 1918 |
| 2,123,833 | Knowles | July 12, 1938 |
| 2,166,893 | Holstein | July 18, 1939 |
| 2,292,401 | Orre | Aug. 11, 1942 |
| 2,314,994 | Lawson et al. | Mar. 30, 1943 |
| 2,366,792 | Kirkbride | Jan. 9, 1945 |
| 2,380,077 | Schutte | July 10, 1945 |
| 2,394,016 | Schutte et al. | Feb. 5, 1946 |
| 2,397,868 | Jenkins | Apr. 2, 1946 |
| 2,443,840 | Stoessel | June 22, 1948 |
| 2,645,598 | Myers et al. | July 14, 1953 |
| 2,645,599 | Payne | July 14, 1953 |

FOREIGN PATENTS

| | | |
|---|---|---|
| 14,114 of 1884 | Great Britain | July 24, 1885 |
| 450,367 | Great Britain | July 16, 1936 |